United States Patent [19]

Hiller et al.

[11] 4,217,583
[45] Aug. 12, 1980

[54] MOVING TARGET INDICATOR (MTI) RADAR SYSTEMS

[75] Inventors: Edwin R. Hiller, Weston, Mass.; Philip D. Kaplan, Nashua, N.H.; Joseph M. Nicosia, Jr., Acton; Henry D. Zuerndorfer, Lexington, both of Mass.

[73] Assignee: Raytheon Company, Lexington, Mass.

[21] Appl. No.: 582,965

[22] Filed: May 30, 1975

[51] Int. Cl.² .................................................. G01S 9/42
[52] U.S. Cl. ................................ 343/7.7; 343/7 A; 343/16 M
[58] Field of Search ...................... 343/16 M, 7.7, 7 A

[56] References Cited

U.S. PATENT DOCUMENTS

| 3,309,701 | 3/1967 | Bollinger et al. | 343/7.7 |
|---|---|---|---|
| 3,550,126 | 12/1970 | Hijfte et al. | 343/7.7 |
| 3,806,929 | 4/1974 | Moore | 343/7.7 |
| 3,903,525 | 9/1975 | Mullins et al. | 343/7.7 |

Primary Examiner—S. C. Buczinski
Attorney, Agent, or Firm—Richard M. Sharkansky; Joseph D. Pannone

[57] ABSTRACT

Method and apparatus for the detection of a ground moving target using a moving platform MTI radar system are disclosed. Such a moving target is detected by comparing the power level of radar return signals passing in a difference channel of a monopulse receiver with a predetermined power level. In one embodiment, a monopulse antenna of such receiver scans a swath of ground and the power level of radar returns passing in the difference channel having a Doppler frequency equal to the Doppler frequency associated with clutter disposed along the boresight axis of such antenna is compared with a predetermined power level. When the power level of returns in such difference channel at such Doppler frequency is greater than the power level of returns from clutter disposed along the boresight axis (i.e., the predetermined power level), a moving target is indicated. Such embodiment is particularly adapted to detect "slow" moving targets, that is, targets disposed in the main beam of the monopulse antenna and having a Doppler frequency within the Doppler frequency spectrum of returns from clutter disposed within such main beam.

In a second embodiment of the invention the power level of returns passing through the difference channel having a Doppler frequency outside the Doppler frequency spectrum of returns from clutter disposed within the main beam is compared with the power level of returns passing through a sum channel of such monopulse receiver having such Doppler frequency. When the former power level is less than the latter power level, a moving target is indicated. This embodiment is particularly adapted to detect "fast" moving targets (that is, targets disposed in the main beam but having Doppler frequencies outside the Doppler frequency spectrum of returns from clutter disposed in the main beam) from large stationary objects disposed outside the main beam and illuminated by the side lobes of the monopulse antenna.

13 Claims, 11 Drawing Figures

FIG. 8 though 4,217,583

MOVING TARGET INDICATOR (MTI) RADAR SYSTEMS

BACKGROUND OF THE INVENTION

The invention relates generally to moving target indicator (MTI) radar systems and more particularly to moving platform MTI radar systems.

As is known in the art a radar system may be used to detect moving targets when the Doppler frequency of such targets are outside the Doppler frequency spectrum associated with stationary clutter. When, however, such a radar system is carried on a moving platform, such as an aircraft, the Doppler frequency of a "slow" moving ground target may be within the Doppler frequency spectrum associated with the "moving" ground clutter, thereby making detection of such "slow" moving target difficult, if not impossible. Further, when the Doppler frequency of a return lies outside the clutter Doppler frequency spectrum (i.e., the spectrum associated with clutter disposed in the main beam of the radar system's antenna), such return may be from a "fast" moving target disposed within such main beam or, alternatively, from a relatively large stationary ground object disposed within a sidelobe of such antenna. In either case, the ability of the radar system on a moving platform to detect a moving target is degraded.

SUMMARY OF THE INVENTION

With this background of the invention in mind it is an object of this invention to provide an improved moving target indicator (MTI) radar system such system being adapted to be carried on a moving platform and having a relatively high reliability to detect moving targets.

This and other objects of the invention are attained generally by a method and apparatus for detecting moving targets comprising the step of comparing the power level of radar return signals passing in a difference channel of a monopulse receiver with a predetermined power level.

In one embodiment of the invention, a monopulse antenna of such receiver scans a swath of ground and the power level of radar returns passing in a difference channel of a monopulse receiver and having a Doppler frequency, $f_B$, equal to the Doppler frequency associated with clutter disposed along the boresight axis of such monopulse antenna are compared with a predetermined power level. When the predetermined power level is exceeded by the power level in the returns passing through the difference channel having a Doppler frequency, $f_B$, such returns are attributable to a moving target. Such embodiment is particularly adapted for the detection of "slow" moving targets.

In another embodiment of the invention, particularly adapted to detect "fast" moving targets, the power level of returns passing through the difference channel of a monopulse receiver having a Doppler frequency outside the Doppler frequency spectrum of returns from clutter disposed with the main beam of a monopulse antenna is compared with the power level of returns passing through a sum channel having such Doppler frequency. When the power level of the former signal is less than the power level of the latter signal an indication of "fast" moving target is provided.

BRIEF DESCRIPTION OF THE DRAWINGS

Other objects and many of the attendant advantages of the invention will be readily appreciated as the same becomes better understood by reference to the following detailed description when considered in connection with the accompanying drawings wherein.

DESCRIPTION OF THE PREFERRED EMBODIMENTS

Figure 1:
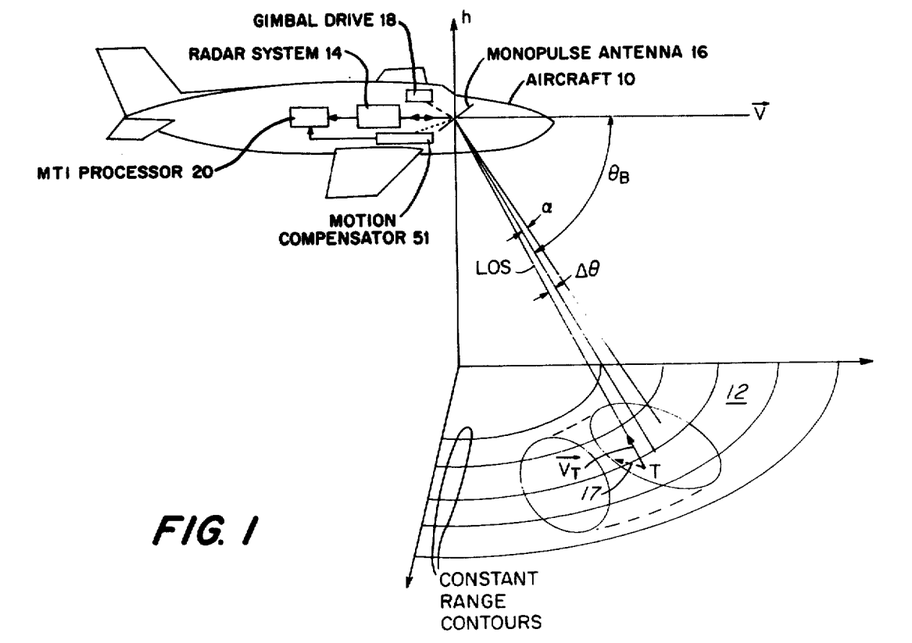
FIG. 1 is a sketch, somewhat distorted, showing an aircraft carrying a radar system and processor particularly adapted to detect "slow" moving ground targets according to the invention.

Referring now to FIG. 1 aircraft 10 is shown flying relative to the ground 12 with a velocity indicated by the vector V. Such aircraft 10 carries a pulse Doppler radar system 14, a monopulse antenna 16 coupled to such radar system in a conventional manner, a gimbal drive 18 for slewing the monopulse antenna 16 (here at a rate of 4°/s) in a manner to be described and a moving target indicator (MTI) processor 20, fed by the pulse Doppler radar system 14, the details of such processor 20 being described in connection with FIG. 2. Suffice it to say here that with such arrangement the monopulse antenna 16 is directed to illuminate a portion of the ground 12 and driven periodically back and forth to scan here a 20° swath of such ground 12 as indicated in FIG. 1. Further, for reasons to become apparent, the monopulse antenna 16 is stabilized by conventional means, not shown, so that the projection of the azimuthal axis of such monopulse antenna 16 on the ground 12 is substantially orthogonal to the isodops (that is, approximately tangent to a constant range contour over the illuminated portion of the ground) during such periodic scanning.

It follows then that the Doppler frequency of clutter returns received by the pulse Doppler radar system 14 may be represented as:

$$f_c = \frac{2V}{\lambda} \cos(\theta_B - \alpha) \qquad \text{Eq. (1)}$$

where:
- $\lambda$ is the radar operating wavelength;
- V is the speed of the aircraft 10;
- $\theta_B$ is the angular deviation of the boresight axis of the monopulse antenna 16 from the direction of flight of the aircraft 10, as indicated in FIG. 1; and
- $\alpha$ is the azimuthal angle of the clutter producing such returns from the boresight axis of the monopulse antenna 16.

The Doppler frequency associated with returns from clutter disposed along the boresight axis of the monopulse antenna 16 may be represented by:

$$f_B = \frac{2V}{\lambda} \cos \theta_B \qquad \text{Eq. (2)}$$

It is further noted that since the monopulse antenna 16 has a "null" in its azimuthal difference pattern along its boresight axis, the energy in returns from clutter disposed along such boresight axis will be significantly lower in amplitude than the energy in returns from objects disposed off such boresight axis. Therefore, the level of energy in the azimuth difference channel of pulse Doppler radar system 14 from clutter having a Doppler frequency $f_B$ will be significantly lower than energy in such channel from clutter returns having Doppler frequencies other than the Doppler frequency $f_B$.

Further if a ground moving target, T, were at an azimuthal incremental angle ($\Delta \theta$) and moving along the ground shown by the dotted line 17, the Doppler frequency associated with such target, T, may be represented by:

$$f_T = \frac{2V}{\lambda} \cos(\theta_B + \Delta\theta) + \frac{2V_T}{\lambda} \qquad \text{Eq. (3)}$$

where $\vec{V}_T$ is the velocity component of the target, T, along the line of sight (LOS) to the aircraft 10.

It follows then that, with proper relationships between the angles, $\theta_B$, $\Delta\theta$, and the speeds V, $V_T$, the Doppler frequency associated with the moving target, T (i.e., the Doppler frequency $f_T$) may be equal to the Doppler frequency of clutter disposed along the boresight axis when:

$$V \cos(\theta_B + \Delta\theta) + V_T = V \cos \theta_B \qquad \text{Eq. (4)}$$

Since, however, such target, T, is not, at every scan angle, disposed along the boresight axis of the monopulse antenna 16 and therefore is not necessarily at the "null" of the azimuthal difference pattern of such antenna (as discussed in the example above), the energy in the returns from such target, T, in the azimuthal difference channel of the pulse Doppler radar system 14 may, therefore, be significantly larger than the energy in such channel from returns from clutter disposed along the boresight axis, or "null" of the azimuthal difference channel. It follows then that if there is substantial amount of energy in the azimuthal difference channel of the pulse Doppler radar system 14 having a frequency equal to the Doppler frequency of returns from clutter at the "null," such energy must be attributable to the moving target, T.

As will be discussed, the MTI processor 20 operates on the above outlined principle to detect ground moving targets. Such MTI processor is particularly suited to detect "slow" moving targets (i.e., those moving targets which are disposed in the main beam of the monopulse antenna 16 having a Doppler frequency within the Doppler spectrum of clutter) as distinguished from "fast" moving target (i.e., those moving targets having Doppler frequencies greater than returns from clutter disposed in the main beam). That is, because the level of energy of clutter returns having a Doppler frequency $f_B$ is relatively low, in the azimuthal difference channel of the pulse Doppler radar system 14 if the level of energy at such frequency in such channel is relatively high, such energy must be attributable to returns from a moving target.

Figure 2:
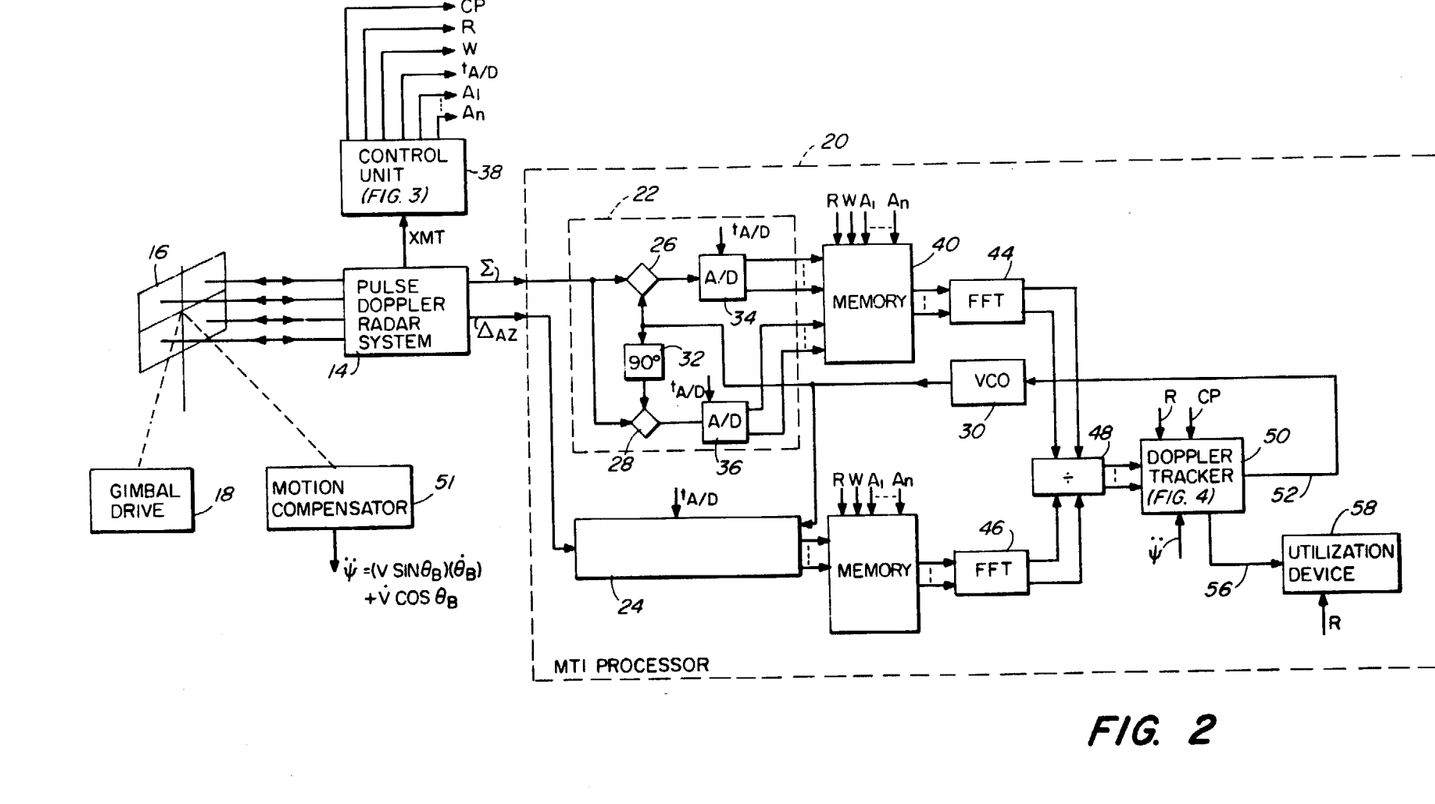
FIG. 2 is a block diagram of an MTI processor and a radar system carried by the aircraft shown in FIG. 1.

Referring now to FIG. 2, the MTI processor 20 is shown coupled to the sum channel, $\Sigma$, and azimuthal difference channel, $\Delta_{AZ}$, of the pulse Doppler radar system 14. The signals produced by such radar system 14 on the sum channel, $\Sigma$, and azimuthal difference channel, $\Delta_{AZ}$, are conventional bipolar video signals. The amplitudes of such signals vary from pulse to pulse at the Doppler frequency of each illuminated object. Such processor 20 includes a pair of quadrature phase detector sections 22, 24 coupled to the sum channel, $\Sigma$, and azimuthal difference channel, $\Delta_{AZ}$, as shown. Such quadrature phase detector sections 22, 24 are identical in construction. An exemplary one thereof, here quadrature phase detector section 22, is shown to include a pair of phase detectors 26, 28 fed by the signals in the sum channel, $\Sigma$. Phase detector 26 is also fed with a signal produced by a voltage controlled oscillator (VCO) 30. Phase detector 28 is also fed with such VCO produced signal after such signal has the phase thereof shifted by 90° C. by a conventional phase shifter 32, as shown. It follows then that the signals produced at the output of phase detectors 26, 28 are quadrature, bipolar video signals. Such signals are passed through analog to digital (A/D) converters 34, 36. The A/D converters 34, 36, in response to actuating signals produced on lines $t_{A/D}$ by control unit 38, the details of which will be described in connection with FIG. 3, convert such quadrature bipolar signals into corresponding digital words, each one of such words having two portions, the first portion being the "real" portion (i.e., the digital words produced by A/D converter 34) and the second portion being the "imaginary" portion (i.e., the digital words produced by A/D convertor 36).

Figure 6:
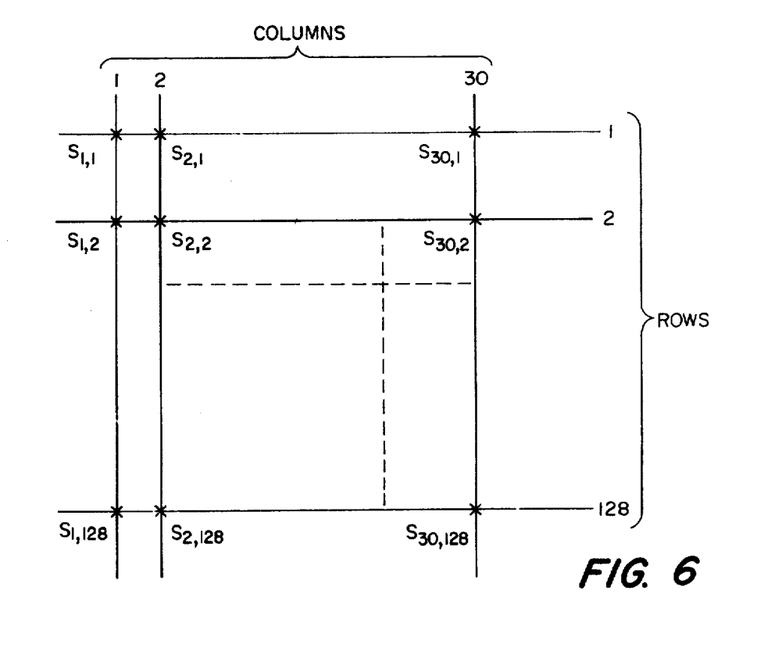
FIG. 6 is a diagram useful in understanding the operation of random access memories used in the MTI processor shown in FIG. 2.

The digital words produced by the quadrature phase detector sections 22, 24 are passed to conventional random access memories 40, 42, as indicated, such memories having conventional storage means (not shown) arranged in a matrix of 30 columns and 128 rows (FIG. 6). Such memories 40, 42 are placed either in a read condition by raising to a high level the signal on line R, or, alternatively, a write condition by raising to a high level the signal on line W. The addresses for such memories 40, 42 are provided by digital words appearing on lines $A_1$-$A_n$. The signals on lines R and W and the digital words on lines $A_1$-$A_n$ are produced by the control unit 18 (FIG. 3), one portion of such lines providing the "row" address for such memories and the other portion of such lines providing the "column" address therefore. As will become apparent hereinafter, in response to the signals produced by the control unit 18, 30 sets of 128 digital words are periodically retrieved from the memories 40, 42, the 128 digital words in each one of such 30 sets thereof representing the bipolar video signals associated with radar returns from 128 transmitted pulses, being reflected by objects located at a particular predetermined range. That is, 30 range cells are formed each one thereof including samples of the returns of 128 transmitted pulses. The frequency spectra contained in a signal represented by each one of such 30 sets of 128 samples being related to the Doppler frequency of the objects located at one of 30 range cells.

The digital words retrieved from the memories 40, 42 in the manner described, are fed to conventional pipeline fast Fourier transformers (FFT) 44, 46. The FFT's 44, 46 are of any conventional "pipeline" design here adopted to serially provide the frequency components (hereinafter referred to as $f_1, \ldots, f_{128}$) described by each one of the 30 sets of 128 digital words applied thereto being arranged in increasing order of frequency. It follows then that: (a) the 30 sets of digital words serially produced by FFT 44, 46 provide an indication of the Doppler frequencies associated with returns over the 30 ranges; (b) the digital words produced by FFT 44 being associated with the sum antenna pattern of monopulse antenna 16; and (c) the digital words produced by FFT 46 being associated with the azimuthal difference antenna pattern of the monopulse antenna 16. Further, the 128 digital words associated with each one of the 30 sets thereof provide an indication of the energy in each one of the 128 Doppler cells "disposed" across the illuminated portion of the ground 12. The digital words produced at the output of the FFT's 44, 46 are passed to a conventional digital divider 48 for "normalization." To accomplish this end, each successive one of the digital words produced by FFT 46 (i.e., the azimuthal difference channel) is divided by the corresponding one of the digital words produced by FFT 44 (i.e., the sum channel).

The "normalized" digital words serially produced by the divider 48 are passed to a Doppler tracker 50, the details of which are described in connection with FIG. 4. Suffice it to say here that such Doppler tracker 50 produces a signal on line 52, such signal being used to control the frequency of the signal produced by the voltage controlled oscillator (VCO) 30. As will become apparent, such arrangement forms a feedback control system which, together with signals produced by a conventional motion compensator 51, causes the MTI processor 20 to track the Doppler frequency associated with returns from clutter disposed along the boresight axis, i.e., to track the frequency, $f_B$, as discussed in connection with FIG. 1. Further, such Doppler tracker 50 produces digital words serially on line 56, each one of such digital words representing the level of energy of returns having the frequency $f_B$, for each one of the 30 ranges. As described in connection with FIG. 1, a significant level of energy having such frequency, $f_B$, indicates the presence of a moving target. The digital words serially produced by Doppler tracker 50 on line 56 are fed to a utilization device 50. Here such utilization device 50 includes a conventional A-Scope. An observer then is able to detect a moving target by observing when the energy displayed by such A-Scope exceeds a predetermined threshold level.

Figure 3:
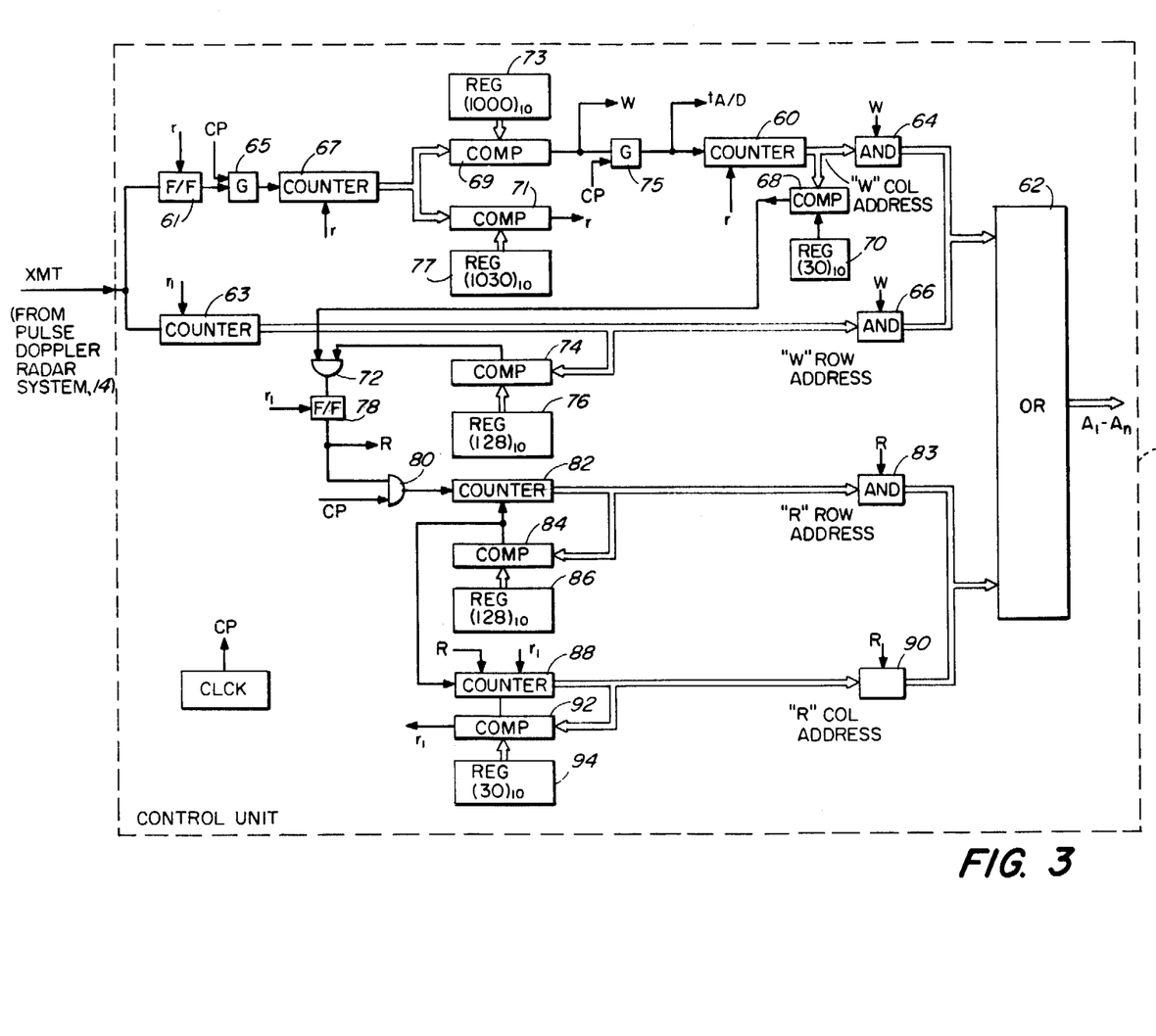
FIG. 3 is a block diagram of a control unit used by the MTI processor shown in FIG. 2.

Referring now to FIG. 3, control unit 38 is shown. Such control unit 38 is coupled to the pulse Doppler radar system 14 (FIG. 2) via line XMT. Line XMT is coupled to a conventional transmit pulse generator (not shown) included in the pulse Doppler radar system 14. Each time a radio frequency pulse is transmitted by such pulse Doppler radar system 14, a pulse is produced on line XMT. Such pulse is fed a flip/flop (F/F) 61 (to force that element to its "set" condition) and to a conventional digital counter 63. The contents of the counter 63 are passed to the row address portion of the lines $A_1$-$A_n$ via an OR gate 62 when an AND gate 66 is enabled by a "high" signal on line W to provide the row address of memories 40, 42. When the F/F 61 is in its "set" condition, clock pulses produced by a conventional clock pulse generator CLCK (here adapted to produce "clock pulse" every 0.05 μsec) pass through a gate 65. The clock pulses passing through such gate 65 are counted by a conventional counter 67. The contents of such counter 67 are passed to a pair of digital comparators 69, 71. A register 73 here having stored therein a digital word representation of $(1000)_{10}$ is provided, the output of such register 73 being coupled to the comparator 69. Such comparator 69 produces a "high" (or 1) signal at its output when the contents of counter 67 is equal to or greater than $(1000)_{10}$. The output of the comparator 69 is coupled to a gate 75 and to line W. Also coupled to such gate 75 is line cp. Therefore, when the signal at the output of comparator 69 is "high" clock pulses pass through such gate 75 to line $t_{A/D}$ and to a counter 60. The contents of counter 60 are passed to the column address portion of the lines $A_1$-$A_n$ via an OR gate 62 when an AND gate 64 is enabled by a "high" signal on line W. As will become apparent hereinafter, the contents of counter 60 provide the "column" address for the memories 40, 42 (FIG. 1) when such memories are in the "write" condition. A register 77 here having stored therein a digital word representative of $(1030)_{10}$ is provided, the output of such register 77 being coupled to comparator 71. Such comparator 71 produces a "high" (or 1) signal at its output, here on line r, when the contents of such counter is equal to $(1030)_{10}$. Line r is fed, inter alia, to the reset terminals of the F/F 61 and counter 67.

Figure 5:
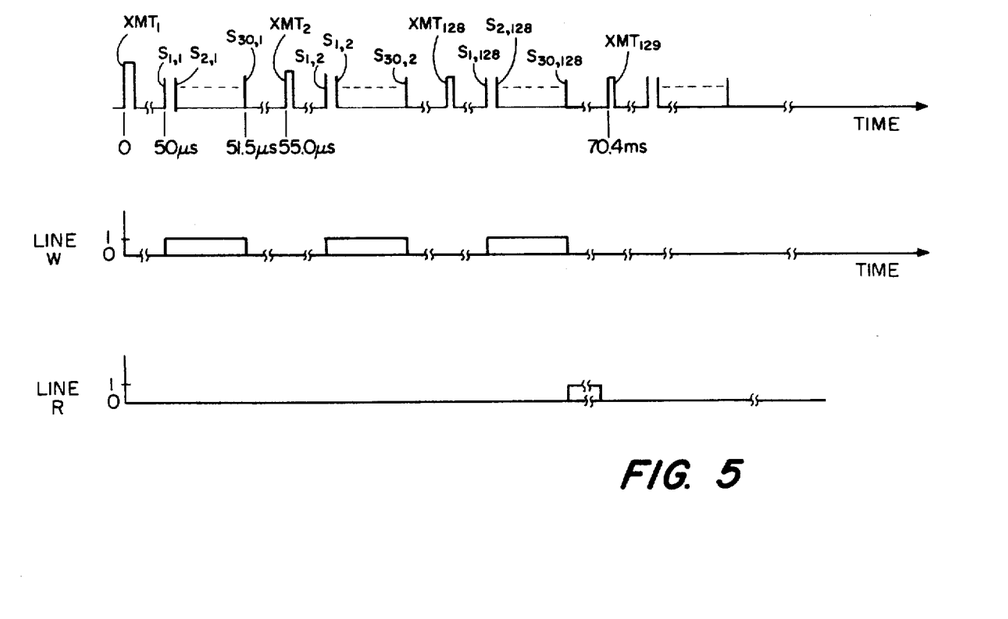
FIG. 5 is a timing diagram useful in understanding the operation of the MTI processor shown in FIG. 2.

In operation, and referring also to FIG. 5, when the first radio frequency (RF) pulse $XMT_1$ is transmitted by the pulse Doppler radar system 14 clock pulses are enabled to pass through gate 65 to be counted by counter 67. When 1000 clock pulses are counted (that is, 50 μsec after the RF pulse was transmitted), the signal on line W is raised to place the memories 40, 42 in the "write" condition and to enable clock pulses to pass through gate 75. The clock pulses passing through gate 25 are passed to the A/D converters 34, 36 (FIG. 1) via line $t_{A/D}$ and, therefore, digital words are serially applied to the memories 40, 42 from the pair of quadrature phase detectors 22, 24 (FIG. 1), here one every 0.05 μsec. Synchronously therewith the memories 40, 42 are addressed by the contents of counters 63, 60. Because the F/F 41, counter 67 and counter 60 are reset when the contents of counter 67 are $(1030)_{10}$ (i.e., after 30 digital words are applied to the memories 40, 42), such 30 digital words $S_{1,1}$-$S_{30,1}$ become stored in the storage means (not shown) of such memories 40, 42, located at row 1, columns 1-30, respectively. Therefore, the storage means (not shown) in each one of the rows has stored therein a digital word associated with a different one of the 30 ranges.

When the second RF pulse $XMT_2$ is transmitted (here 550 μsec after the first RF pulse $XMT_1$), the contents of counter 63 increments to $(2)_{10}$ in response to the pulse on line XMT and, hence, the returns associated with such second RF pulse (XMT$_2$) (i.e., $S_{1,2}$-$S_{30,2}$) become stored in storage cells of memories 40, 42, located at row 2, columns 1-30, respectively. It follows then that as the process of RF pulse transmission (here once every 550 μsec) continues the memories 40, 42 have stored in adjacent rows thereof the words representative of the returns from adjacent ranges, as indicated in FIG. 6.

Considering now the read operation of the memories 40, 42 (FIG. 1) (which also starts the processing of the stored data), it is noted that, referring to FIGS. 3 and 5, the contents of counter 60 are passed to a comparator 68. Also applied to such comparator 68 is the output of a register 70, here having stored therein $(30)_{10}$. The comparator 68 produces a "high" signal when the contents of counter 60 reaches $(30)_{10}$. Therefore, after the 30 digital words associated with each one of the transmitted RF pulses has become stored in the memories 40, 42, a "high" signal is supplied to AND gate 72. Also applied to such AND gate 72 is a signal produced by a comparator 74. Such comparator 74 is coupled to the output of counter 63 and to a register 76, such register 76 having stored therein $(128)_{10}$. The signal produced by the comparator 74 is "high" when the contents of counter 63 is equal to $(128)_{10}$. It follows then that after the memories 40, 42 have the 30 digital words stored therein as just described, and after the 128th RF pulse (XMT)$_{128}$ has been transmitted, the output of AND gate 72 is raised thereby to set F/F 78. When such F/F 78 is set, the signal on line R is raised thereby placing the memories 40, 42 in the read condition and clock pulses are allowed to pass through AND gate 80 to a counter 82.

The clock pulses passing through AND gate 80 are counted by the counter 82. The output of such counter 82 is fed, inter alia, to the row address portion of the lines $A_1$-$A_n$ via OR gate 62 when AND gate 83 is enabled by a "high" signal on line R. As will become apparent hereinafter, the contents of counter 82 provide the "row" address for the memories 40, 42 when such memories are in the read condition. The output of counter 82 is also fed to a comparator 84. Also coupled to such comparator 84 is a register 86 here having stored therein $(128)_{10}$. When the contents of counter 82 reach $(128)_{10}$ the comparator 84 produces a "high" signal to reset, inter alia, counter 82. Also, each time such "high" signal is produced, a counter 88 becomes incremented having been set to $(1)_{10}$ in response to a "high" signal on line R. The contents of counter 88 are passed to the column address portion of the lines $A_1$-$A_n$ via OR gate 62 when AND gate 90 is enabled by a "high" signal on line R, as will become apparent hereinafter. The contents of counter 88 provide the "column" address for memories 40, 42 when such memories are in the read condition. The output of counter 88 is fed to comparator 92. Also coupled to such comparator 92 is a register 94 here having stored therein $(30)_{10}$. When the contents of counter 88 reach $(30)_{10}$ comparator 92 produces a "high" signal on line $r_1$, thereby to reset: counter 63, F/F 78 and counter 88.

In operation, and referring also to FIG. 5, after the 128th RF pulse (XMT$_{128}$) has been transmitted and after 30 digital words $S_{1,128}$-$S_{30,128}$ have been stored in the memories 40, 42, as described above, the signal on line R is raised to "1" and therefore such memories are placed in a read condition. Data is read serially from such memories 40, 42 at: locations "column" $(1)_{10}$, rows $(1)_{10}$-$(128)_{10}$ (i.e., $S_{1,1}$-$S_{1,128}$); then, locations "column" $(2)_{10}$, rows $(1)_{10}$-$(128)_{10}$, etc. $(S_{2,1}$-$S_{2,128})$. When all 30 ($S_{30,1}$-$S_{30,128}$) columns of data are read, a "high" signal is produced on line $r_1$, thereby to reset counter 63 F/F 78 and counter 88 in the manner discussed, so that the operation of the control unit 38 in response to the 129th transmitted RF pulse (XMT$_{129}$) is equivalent to the operation of such control unit 38 in response to the first transmitted RF pulse (XMT$_1$).

In summary the control unit 38 enables, once every 70.4 μsec, 30 sets of 128 digital words to be serially retrieved from the memories 40, 42. Each one of the 30 sets corresponds to the digital bipolar video signals of one of thirty range cells. The rate of change of the "signal" represented by the 128 digital words, in each one of such thirty sets thereof, represents the Doppler frequency spectrum of the objects at such one of the thirty ranges.

Figure 4:
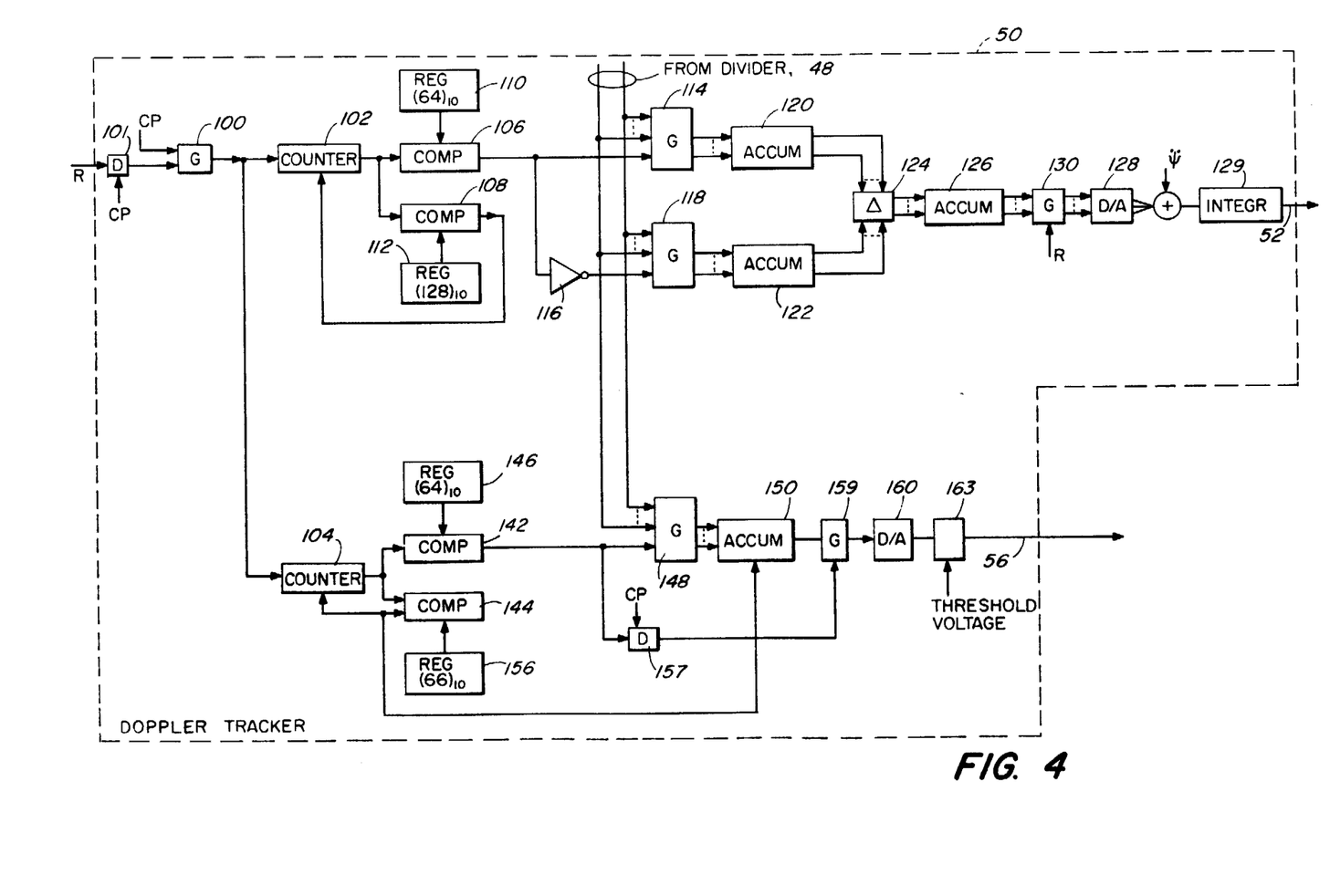
FIG. 4 is a block diagram of a Doppler tracker used in the MTI processor shown in FIG. 2.

Referring now to FIG. 4 the Doppler tracker 50 is shown. The signal on line R is passed through a conventional delay means 101, here to provide a delay in the order of 6.4 μsec so that when the data stored in memories 40, 42 has been serially retrieved and serially normalized by divider 48, clock pulses on line cp are allowed to pass through gate 100 to counters 102 and 104. The contents of counter 102 are fed to a comparator 106 and a comparator 108. Also coupled to comparator 106 is a register 110 here having stored therein $(64)_{10}$. Also coupled to counter 108 is a register 112 here having stored therein $(128)_{10}$. When the contents of counter 102 are equal to or less than $(64)_{10}$ the signal produced by comparator 106 goes "high" thereby enabling gate 114 to pass the first 64 (i.e., $S_{1,1}$-$S_{64,1}$) applied thereto from divider 48. Further, when the signal produced by comparator 106 is "low," i.e., when the contents of counter 102 are greater than $(64)_{10}$, a "high" signal is produced at the output of inverter 116 thereby to enable gate 118 to pass the second 64 digital words (i.e., $S_{65,1}$-$S_{128,1}$) applied thereto from divider 48. When the contents of counter 102 are equal to or greater than $(128)_{10}$ the output of comparator 108 goes "high" thereby to reset counter 102 to enable the process to continue for successively retrieved digital words (i.e., $S_{1,2}$-$S_{30,128}$).

In operation when the memories 40, 42 are placed in the read condition the first 64 digital words of the 128 digital words associated with the first one of the thirty cells, after being normalized by divider 48, are passed through gate 114 to an accumulator 120 and the second 64 digital words of the 128 digital words (after being normalized by divider 48) are passed through gate 118 to accumulator 122. The outputs of accumulators 120, 122 are passed through a digital subtractor 124 and then to an accumulator 126. It follows then that after the first 128 clock pulses are passed to counter 102 the digital word stored in accumulator 126 represents the difference in energy level between the returns from objects on one side of the azimuth "null" of the monopulse antenna 14 (FIG. 1) and the returns from objects on the other side of such "null," such objects all being at the same "first" range. It follows then that the contents of accumulator 126, after the 30 sets of 128 digital words have been retrieved and processed, represents the described energy level difference averaged over the 30 range cells. (It is noted that accumulator 126 is reset when the signal on line R goes "high.")

The digital word stored into accumulator 126 is passed to a digital to analog convertor 128 via gate 130 in response to the "high" signal on line XMT and therefore is passed to such converter in response to the next transmitted pulse. This analog signal is combined with a signal $\dot{\psi}$ produced by the motion compensator 51. The signal, $\dot{\psi}$, is representative of the rate of change of the Doppler frequency $f_B$ (Eq. (2)). That is, $\dot{\psi} = (V \sin \theta_B \, d\theta_B/dt) + (dV/dt \cos \theta_B)$. The purpose of the signal $\dot{\psi}$ is to provide for anticipatory changes in Doppler frequency $f_B$ caused by slewing the antenna and aircraft velocity changes thereby to enable the "feedback" arrangement to track the Doppler frequency $f_B$ with zero steady state error. The combined signal is passed through a conventional integrator 129 to provide a control signal on line 52 for the voltage controlled oscillator (VCO)$^{30}$.

It follows then that the analog control signal on line 52 drives the VCO$^{30}$ so that, when a steady state exists, the return energy from clutter disposed along the boresight of the antenna 16 (clutter returns having a frequency, $f_B$) is at the "center" of the frequency spectrum being analyzed. Therefore, by averaging the values represented by the 64th and 65th digital words produced by the divider 48 associated with each of the range cells, one is able to determine the amount of energy in the returns having a frequency, $f_B$.

Figure 7:
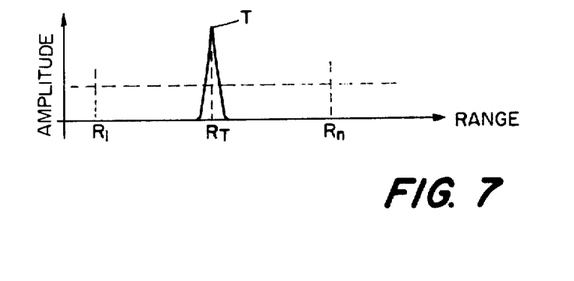
FIG. 7 is a sketch showing the output of an A-scope used by the MTI processor shown in FIG. 2.

The 64th and 65th digital words of each one of the 30 sets thereof are passed to the utilization device (FIG. 1). In particular, referring to FIG. 4, clock pulses passing through gate 100 are counted by counter 104. The output of counter 104 is fed to a comparator 142 and a comparator 144. Also coupled to comparator 142 is a register 146 having stored therein $(64)_{10}$. Also coupled to comparator 144 is a register 156 having $(66)_{10}$ stored therein. When the contents in counter 104 is greater than $(66)_{10}$ the output of comparator 144 goes "high" thereby to reset counter 104. When the contents stored in counter 104 are equal to or greater than $(64)_{10}$ a "high" signal is produced by comparator 142 thereby to enable the 64th and 65th digital words from divider 48 to pass through gate 148 to an accumulator 150. (It is here noted that accumulator 150 is reset in response to a "high" signal produced by comparator 144.) If follows then that for each one of the 30 range cells the digital word stored in accumulator 150 provides an indication of the amount of return energy having a frequency, $f_B$. The digital word is stored in accumulator 150 and is passed to digital to analog converter D/A 160 after such word represents the sum of the 64th and 65th digital words. In particular the output of comparator 142 is passed through 1 clock pulse delay network 157 to a gate 159. Therefore, 1 clock pulse after the output of comparator 142 goes high to pass the 64th digital word to accumulator 150, the 65th digital word is passed to such accumulator. The gate 159 is then enabled to pass the sum of the 64th and 65th digital words to the D/A 160. The analog signal is fed, via line 56, to the utilization device 58 (FIG. 1) through a threshold circuit 163. An A-Scope, the display thereof being shown in FIG. 7, has the "range" or base axis thereof initiated in response to a high signal on line R. The "amplitude" axis of such scope is proportional to the signal on line 56. As indicated in FIG. 7, the amplitude of the signal is displayed when such amplitude is greater than some predetermined threshold voltage fed to the threshold circuit 163 (FIG. 4). When such threshold voltage is exceeded, a moving target, T, is "indicated" since at range $R_n$ the level of the energy having a frequency, $f_B$, exceeds the level of such energy from returns of clutter disposed at the "null" or boresight of the monopulse antenna 16.

Having described an embodiment of the invention wherein an MTI processor 20 is particularly adapted to detect "slow" moving targets (i.e., targets disposed in the main beam of the monopulse antenna 16 and having Doppler frequencies within the Doppler frequency spectrum associated with clutter returns), an embodiment of the invention will now be described wherein "fast" moving targets (i.e., targets disposed in the main beam and having Doppler frequencies outside such Doppler frequency spectrum) are detected.

Figure 8:
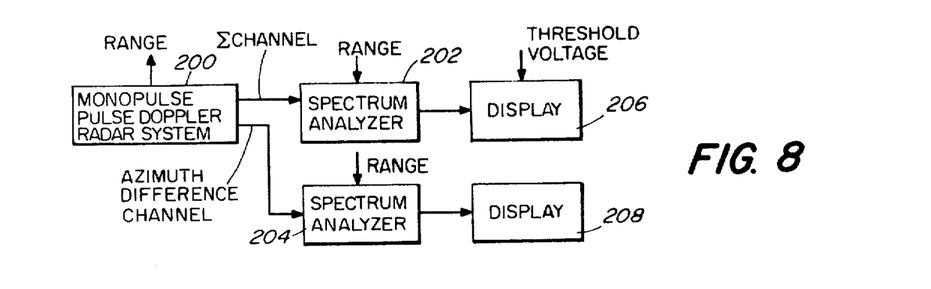
FIG. 8 is a block diagram of a monopulse pulse Doppler radar system and MTI processor adapted to detect "fast" moving ground targets according to the invention.

Referring now to FIG. 8 a monopulse pulse Doppler radar system 200, here of any conventional design and carried on a moving platform, here the aircraft 10 (FIG. 1), has a sum ($\Sigma$) and azimuth difference ($\Delta_{AZ}$) channels coupled to a pair of conventional frequency spectrum analyzers 202, 204, as shown. The outputs of such frequency spectrum analyzers 202, 204 are passed to a pair of conventional displays 206, 208, as shown to display the power amplitude-frequency relationship of the returns in the sum ($\Sigma$) and azimuth difference ($\Delta_{AZ}$) channels, as shown respectively in FIGS. 9A and 9B.

Figure 9A:
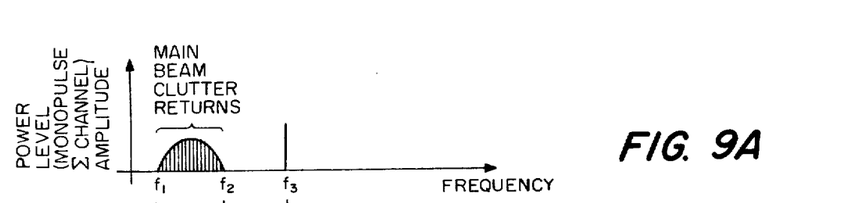
FIG. 9A is a diagram, somewhat distorted, showing the relationship between the power level in typical returns passing through the sum ($\Sigma$) channel of the monopulse radar system shown in FIG. 8 and the Doppler frequency of such returns.
Figure 9B:
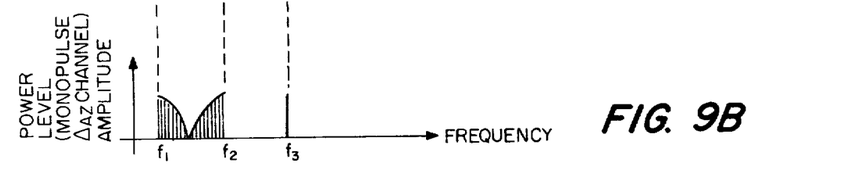
FIG. 9B is a diagram, somewhat distorted, showing the relationship between the power level in typical returns passing through the azimuth difference ($\Delta_{AZ}$) channel of the monopulse radar system shown in FIG. 8 and the Doppler frequency of such returns.

As indicated in FIGS. 9A and 9B, the returns from clutter disposed within the main beam of the monopulse antenna (not shown) used in the monopulse radar system 200 (FIG. 8) have Doppler frequencies between the frequency $f_1$ and the frequency $f_2$. As described above the MTI processor 20 is adapted to detect moving targets having Doppler frequencies between the frequency $f_1$ and the frequency $f_2$. It is noted that a "fast" moving target will have a Doppler frequency greater than the frequency $f_2$. Further, from Eq. (1) a larger "clutter" object, such as a large water tower, disposed outside the main beam of the monopulse antenna pattern (shown in FIG. 10) may also have a "Doppler" frequency greater than the frequency $f_2$. It follows that the return having a frequency $f_3$ may be attributable to one of two objects: (1) a "fast" moving target disposed in the main beam; or (2) a large return from clutter disposed outside the main beam of the monopulse antenna pattern.

Figure 10:
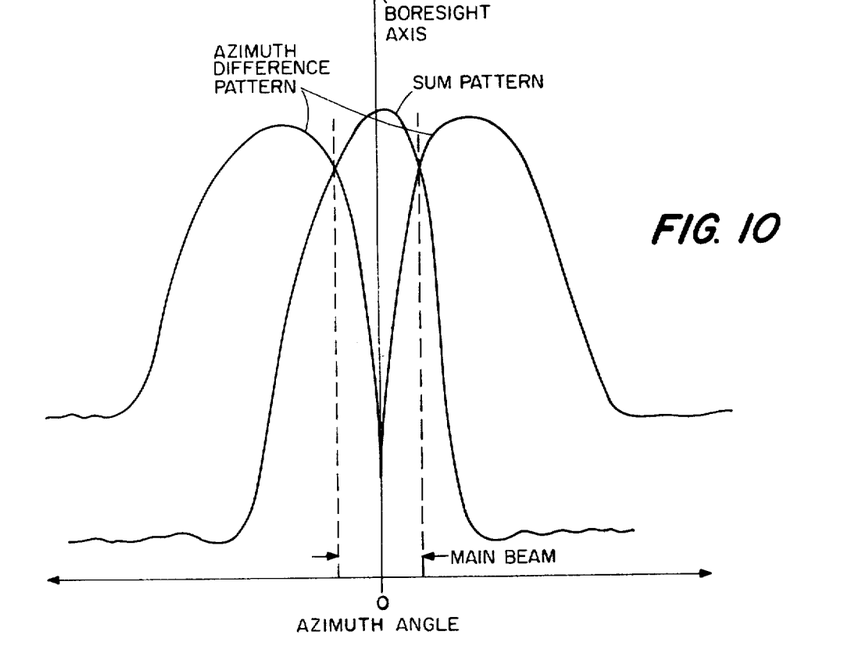
FIG. 10 is a sketch showing the gain vs. azimuth angle relationship of the sum and azimuth difference patterns of a monopulse antenna used by the monopulse radar system shown in FIG. 8.

Referring to FIG. 10 it is noted that, for returns from objects disposed outside the main beam of the monopulse antenna pattern, the gain in the azimuth difference pattern is greater than the gain in the sum pattern. It follows then that if (1) the power level of the return in the sum channel having a frequency $f_3$ is greater than some predetermined threshold level (such threshold level being related to thermal noise in the system) and (2) the power level of the return in the sum ($\Sigma$) channel is greater than the power level of the signal in the azimuthal difference ($\Delta_{AZ}$) channel, then the returns having a frequency $f_3$ is a return from a "fast" moving target disposed in the main beam. Here an observer of the displays 206, 208 is able to detect whether the two just stated conditions are satisfied and hence such observer is able to detect a "fast" moving target.

Having described preferred embodiments of this invention, it is evident that other embodiments incorporating its concepts may be used. For example, while digital processing techniques have been shown analog processing techniques may be used. It is felt therefore that this invention should not be restricted to its embodiments but rather should be limited only by the spirit and scope of the appended claims.

1. In a moving target indicator radar system adapted to be carried on a moving platform, such system including a monopulse receiver adapted to process radar returns comprised of the returns from the moving target and returns from clutter, such clutter returns being within a band of clutter frequencies, the improvement comprising:
  (a) means for providing a reference signal having a predetermined power level; and
  (b) means, responsive to the returns from the moving target and the returns from the clutter, for distinguishing between the clutter returns and the moving target returns to indicate the presence of a moving target having a Doppler frequency within the band of clutter frequencies including means for determing the difference between the power level of the radar returns passing through a difference channel of such receiver at a selected Doppler frequency within the band of clutter frequencies and the predetermined power level of the reference signal, such difference being indicative of a moving target when the former power level is different from the latter power level.

2. The improvement recited in claim 1 including a monopulse antenna coupled to the receiver and wherein the monopulse antenna has a null in a radiation pattern thereof along the boresight axis of such antenna and the determining means determines the difference between the power level of returns in such difference channel at a selected Doppler frequency $f_B$, such selected Doppler frequency being related to the Doppler frequency of the returns from clutter disposed along the boresight axis of such antenna, and the predetermined power level of the reference signal.

3. In a moving target indicator radar system adapted to be carried on a moving platform, such system including a monopulse antenna and a monopulse receiver fed by such antenna, such receiver being adapted to process radar returns comprised of the returns from the moving target and returns from clutter, the improvement comprising:
  (a) means for providing a reference signal having a predetermined power level; and
  (b) means, responsive to the returns from the moving target and the returns from the clutter, for distinguishing between the clutter returns and the moving target returns to indicate the presence of a moving target including means for determining the difference between the power level of the radar returns passing through a difference channel of such receiver and the predetermined power level of the reference signal, such moving target being indicated when the former power level is different from the latter power level, and wherein the monopulse antenna has a sum radiation pattern associated with a sum channel of such receiver, a difference radiation pattern associated with the difference channel and a main beam region where the gain of the sum radiation pattern is greater than the gain of the difference radiation pattern and wherein the determining means determines the difference between the power level of such returns passing through the difference channel having a Doppler frequency $f_{DT}$ outside the portion of the frequency spectrum associated with the returns from clutter disposed within the main beam region and the predetermined power level and wherein the providing means produces the reference signal, such reference signal having the predetermined power level, such power level being related to the power level of the returns passing through the sum channel having a Doppler frequency $f_{DT}$.

4. In a moving target indicator radar system adapted to be carried on a moving platform, such system including a monopulse receiver adapted to process radar return signals fed thereto by an antenna having a null in a radiation pattern thereof, such radar returns being comprised of returns from the moving target and returns from clutter, such clutter returns being within a band of clutter frequencies, the improvement comprising:
  (a) means for providing a signal having a predetermined power level; and
  (b) means, responsive to the returns from the moving target and the returns from the clutter, for distinguishing between the clutter returns and the moving target returns to indicate the presence of the moving target having a Doppler frequency within the band of clutter frequencies including means for determining the difference between the power level of returns in a difference channel of such receiver at a Doppler frequency, $f_B$, within the band of clutter frequencies, such frequency $f_B$ being the Doppler frequency of returns from clutter disposed along the null of the radiation pattern and the predetermined power level, such difference being indicative of a moving target when the power level of returns at the Doppler frequency $f_B$ is different from the predetermined power level.

5. The improvement recited in claim 4 wherein the radar receiver is a monopulse receiver and the antenna having the null in the radiation pattern at the boresight axis of such antenna and the distinguishing means is disposed in the difference channel of such monopulse receiver.

6. The improvement recited in claim 5 including means for shifting the frequency of the returns passing through the difference channel in accordance with the Doppler frequency $f_B$.

7. The improvement recited in claim 6 wherein the shifting means includes means for centering the Doppler frequency spectrum of the returns passing through the difference channel to correspond to the Doppler frequency $f_B$.

8. A method for detecting a moving target using a moving target indicator radar system adapted to be carried on a moving platform, such system including a monopulse radar receiver adapted to process radar returns fed thereto by a monopulse antenna, such radar returns being comprised of the return from the moving target and returns from clutter, such clutter returns being within a band of clutter frequencies, the Doppler frequency of each one of such clutter returns being related to the difference between the angular deviation of the boresight axis of such monopulse antenna from the direction of motion of the moving platform ($\theta_B$) and the angular deviation of such one of the clutter returns from such boresight axis ($\alpha$), comprising the step of: distinguishing between the clutter returns and the moving target returns to indicate the presence of the moving target having a Doppler frequency within the band of clutter frequencies including determining the difference between the power level of the radar returns passing through a difference channel of such monopulse receiver at a selected frequency within the band of clutter frequencies and a predetermined power level, such moving target being indicated when the former power level is different from the latter power level.

9. A method for detecting a moving target using a moving target indicator radar system adapted to be carried on a moving platform, such system including a monopulse radar receiver adapted to process radar returns fed thereto by a monopulse antenna, such radar returns being comprised of the return from the moving target and returns from clutter, the Doppler frequency of each one of such clutter returns being related to the difference between the angular deviation of the boresight axis of such monopulse antenna from the direction of motion of the moving platform ($\theta_B$) and the angular deviation of such one of the clutter returns from such boresight axis ($\alpha$), comprising the step of: distinguishing between the clutter returns and the moving target returns to indicate the presence of the moving target including determining the difference between the power level of the radar returns passing through a difference channel of such monopulse receiver and a predetermined power level, such moving target being indicated when the former power level is different from the latter power level, and wherein the monopulse antenna has a sum radiation pattern associated with a sum channel of such monopulse receiver and a difference radiation pattern associated with the difference channel and a main beam region where the gain of the sum radiation pattern, including the steps of: separating the power of radar returns passing through the sum and difference channels into corresponding Doppler frequency spectra and comparing the power level of such returns passing through the difference channel having a Doppler frequency in the spectrum thereof ($f_{DT}$) outside the portion of such spectrum associated with returns from clutter disposed within the main beam region with the power level of return passing through the sum channel having such Doppler frequency ($f_{DT}$), the moving target disposed within the main beam region being indicated when the former power level having such Doppler frequency $f_{DT}$ is less than the latter power level.

10. The method recited in claim 8 wherein the determining step determines the difference between the power level of returns passing through the difference channel having a Doppler frequency $f_T$ equal to the Doppler frequency $f_B$ of returns from clutter disposed along the boresight axis of such monopulse antenna and the predetermined power level, such moving target being indicated when the former power level is different from the predetermined power level.

11. The method recited in claim 8 including the step of shifting the frequencies of the radar returns passing through the difference channel in accordance with the Doppler frequency $f_B$ of returns from clutter disposed along the boresight axis.

12. A method for detecting a moving target using a moving target indicator radar system adapted to be carried on a moving platform, such system including a monopulse receiver adapted to process radar returns fed thereto by an antenna having a null in the radiation pattern thereof, such radar returns being comprised of a return from the moving target and returns from clutter, such clutter returns being within a band of clutter frequencies, comprising the step of distinguishing between clutter returns and moving target returns to indicate the presence of the moving target having a Doppler frequency within the band of clutter frequencies including determining the difference between the power level of returns in a difference channel of such receiver at a selected Doppler frequency within the band of clutter frequencies, such selected Doppler frequency being the Doppler frequency of returns from clutter disposed along the null of the radiation pattern and a predetermined power level, such difference being indicative of a moving target when the former power level is different from the latter power level.

13. In a moving target indicator radar system adapted to be carried on a moving platform, such system including a monopulse receiver adapted to process radar returns fed thereto by a monopulse antenna, such radar returns being comprised of moving target returns and returns from clutter, such monopulse antenna having a sum radiation pattern associated with a sum channel of such receiver and a difference radiation pattern associated with a difference channel of such receiver and a main beam region where the gain of the sum radiation pattern is greater than the gain of the difference radiation pattern, the improvement comprising:
  (a) means for separating the power of the returns passing through the sum and difference channels into corresponding Doppler frequency spectra;
  (b) means for distinguishing between the clutter returns and the moving target returns to indicate the presence of a moving target including means for determining the difference between the power level of the returns passing through the difference channel having a Doppler frequency in the spectrum thereof outside the portion of such spectrum associated with returns from clutter disposed within the main beam region and the power level of returns passing through the sum channel having such outside Doppler frequency, such moving target being indicated when the former power level is less than the latter power level.

* * * * *